(12) United States Patent
Okumura et al.

(10) Patent No.: US 8,296,931 B2
(45) Date of Patent: Oct. 30, 2012

(54) METHOD FOR MANUFACTURING STORAGE MEDIUM

(75) Inventors: Hiroyoshi Okumura, Higashine (JP); Eishin Yamakawa, Higashine (JP)

(73) Assignee: Showa Denko K.K., Tokyo (JP)

( * ) Notice: Subject to any disclaimer, the term of this patent is extended or adjusted under 35 U.S.C. 154(b) by 1072 days.

(21) Appl. No.: 12/174,136

(22) Filed: Jul. 16, 2008

(65) Prior Publication Data

US 2009/0061742 A1    Mar. 5, 2009

(30) Foreign Application Priority Data

Aug. 27, 2007 (JP) ................ 2007-220206

(51) Int. Cl.
*G11B 5/127* (2006.01)
*H04R 31/00* (2006.01)

(52) U.S. Cl. ............ 29/603.16; 29/603.03; 29/603.13; 29/603.14; 29/603.15; 29/603.18; 451/5; 451/8; 451/10; 451/41; 451/288

(58) Field of Classification Search ............ 29/603.03, 29/603.07, 603.13–603.16, 603.18; 83/684–691, 83/948; 360/77.11, 97.02, 97.04, 132, 133, 360/135; 451/5, 41
See application file for complete search history.

(56) References Cited

U.S. PATENT DOCUMENTS

| 2006/0027527 A1 | 2/2006 | Yokota et al. | |
| 2009/0239446 A1* | 9/2009 | Fukuda et al. | 451/5 |

FOREIGN PATENT DOCUMENTS

| JP | U 60-60014 | 4/1985 |
| JP | 11-010527 | 1/1999 |
| JP | 2001-047359 | 2/2001 |
| JP | 2002-134448 | 5/2002 |
| JP | 2003-136689 | 5/2003 |
| JP | A 2006-48870 | 2/2006 |
| JP | 2006-198751 | 8/2006 |

OTHER PUBLICATIONS

Office Action issued by the Patent Office of Japan for related JP Application No. 2007-220206, mailed Mar. 6, 2007, with English language translation.
Decision of a Patent Grant issued by the Patent Office of Japan for related JP Application No. 2007-220206, mailed Aug. 17, 2012, with copy of English language translation.

* cited by examiner

*Primary Examiner* — Paul D Kim
(74) *Attorney, Agent, or Firm* — Greer, Burns & Crain, Ltd.

(57) ABSTRACT

According to an aspect of an embodiment, a method for manufacturing a storage medium includes providing a medium plate member for forming the storage medium and a guide member; and aligning the medium plate member and the guide member so that the medium plate member and the guide member are placed adjacently and the surfaces of the medium plate member and the guide member form a substantially common plane. The method further includes guiding a burnishing member for burnishing the medium plate member onto the surface of the guide member; and sliding the burnishing member on the guide member onto the medium plate member so as to burnish the surface of the medium plate member.

6 Claims, 12 Drawing Sheets

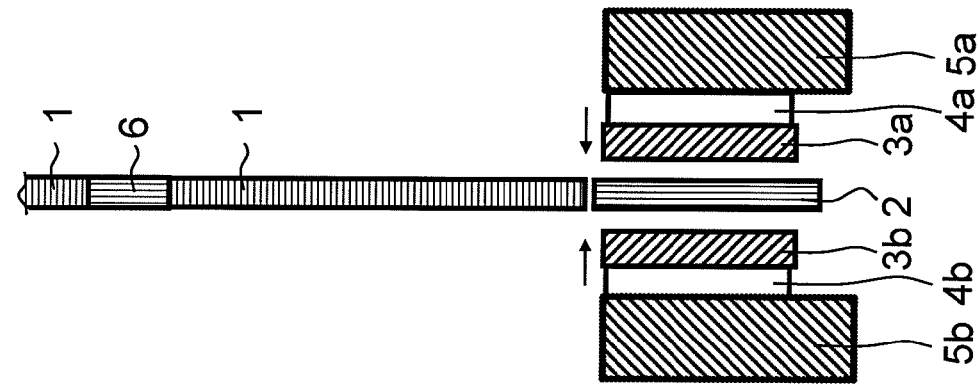
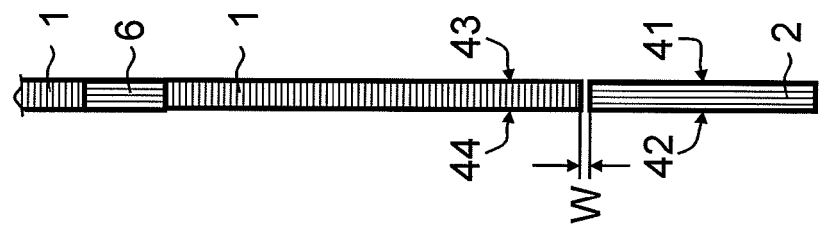

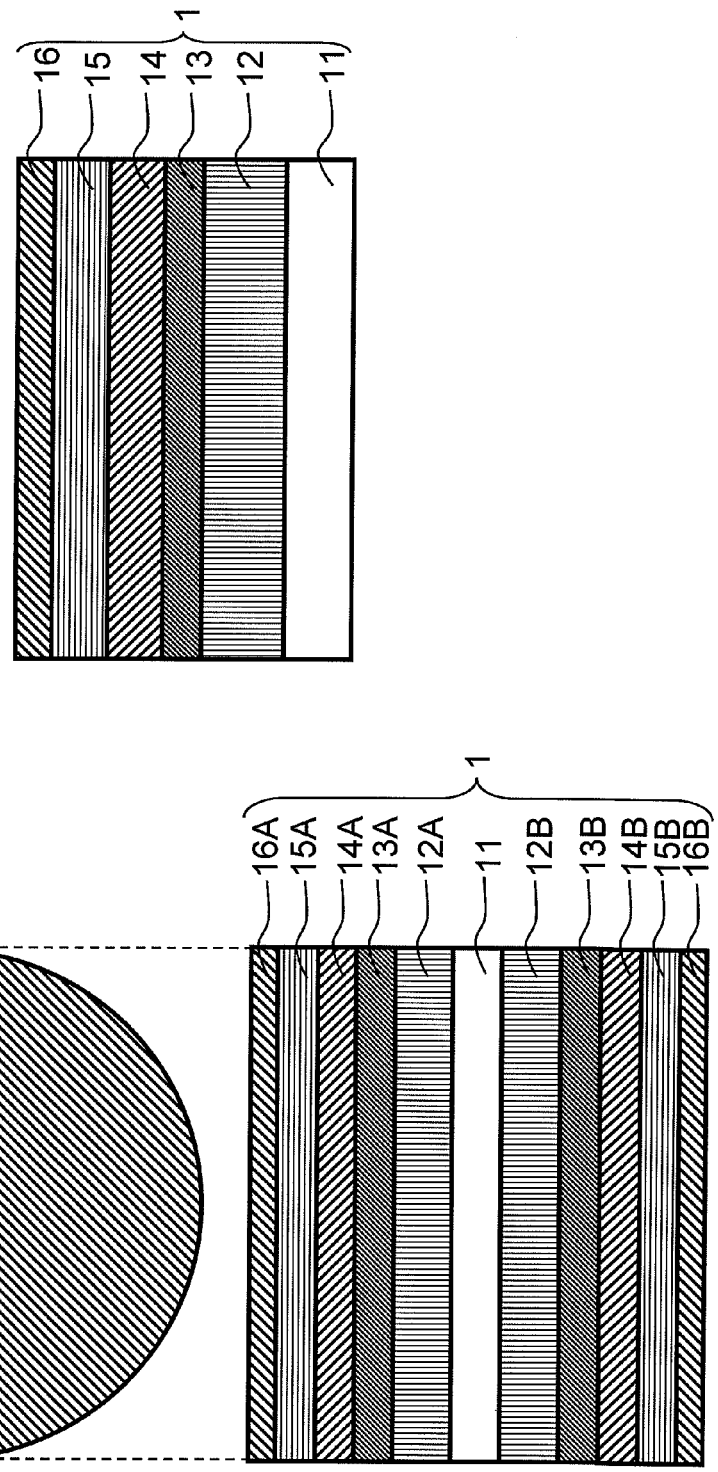

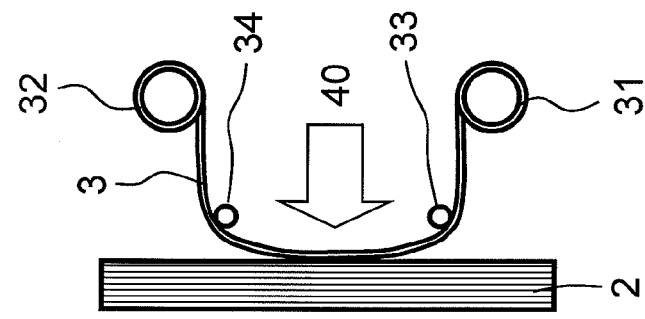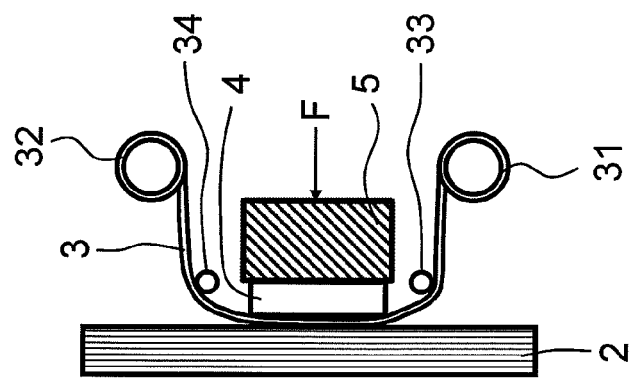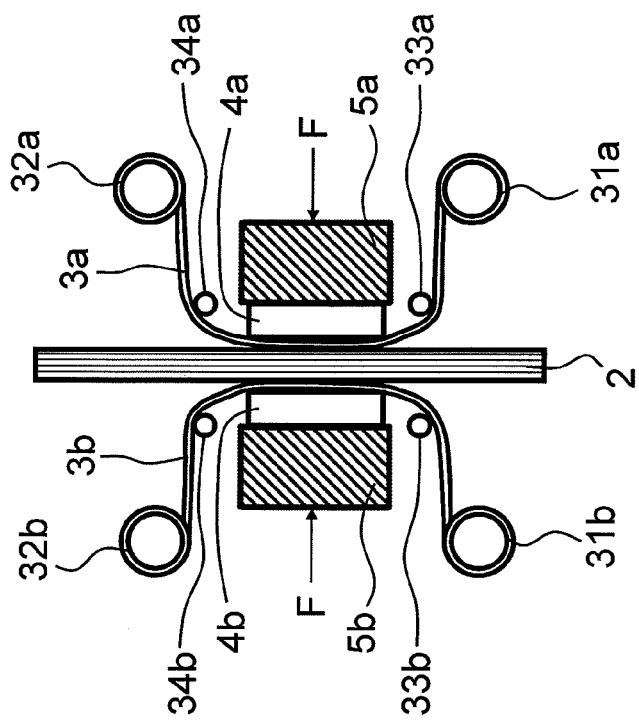

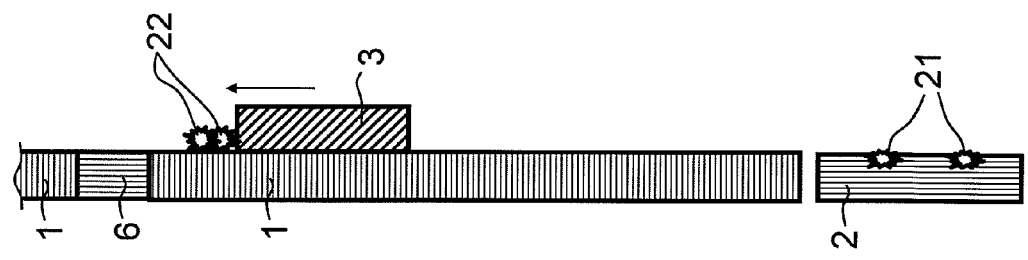
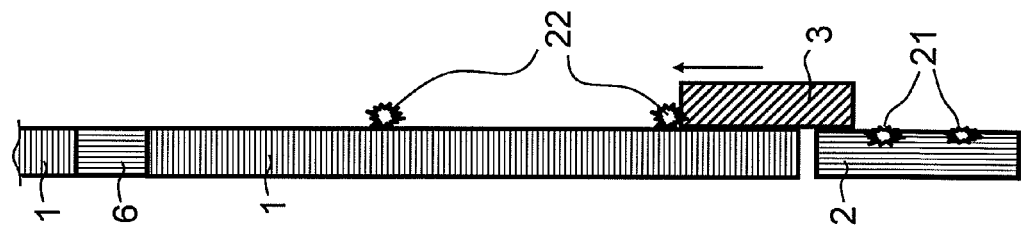
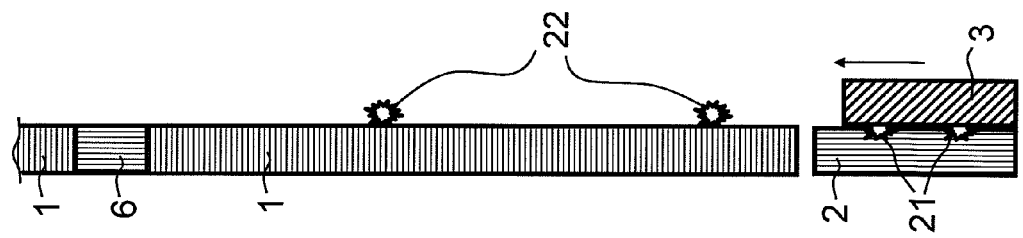
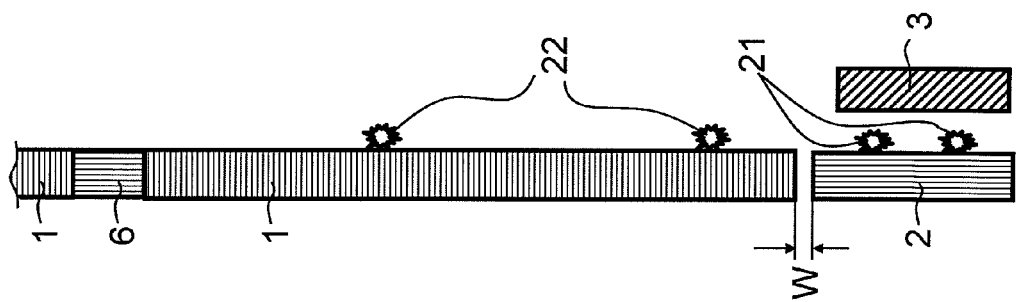

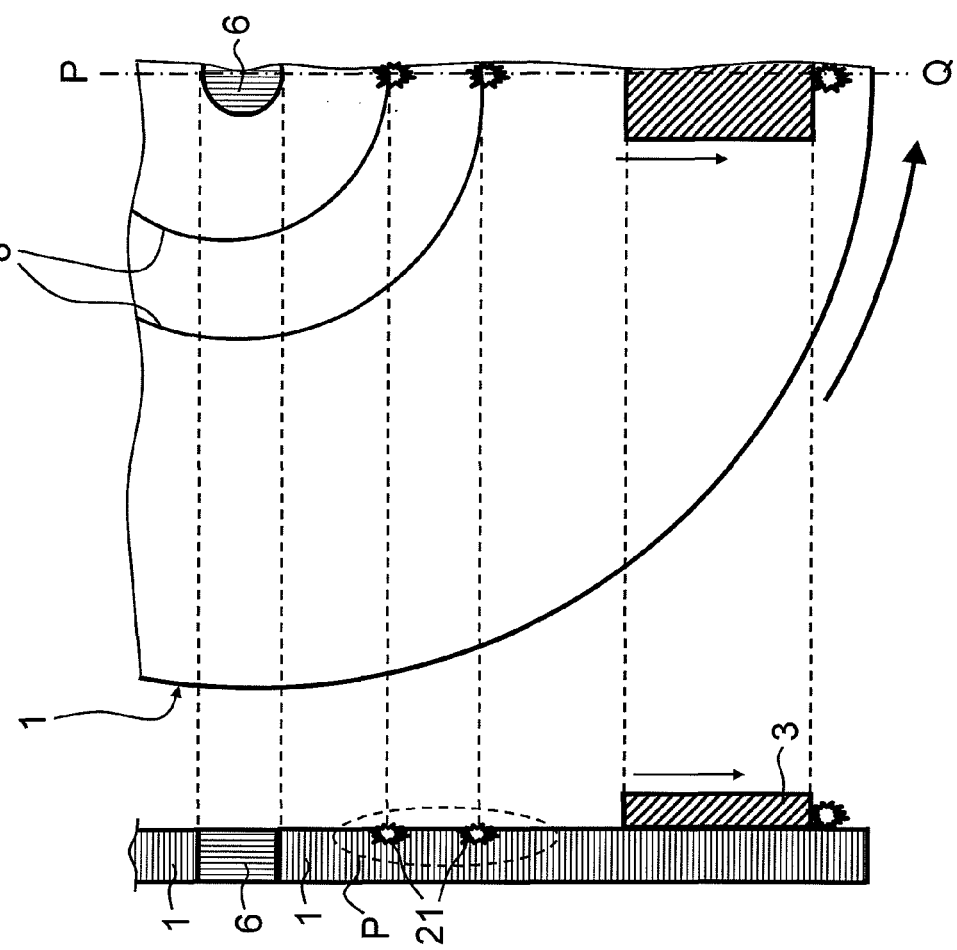
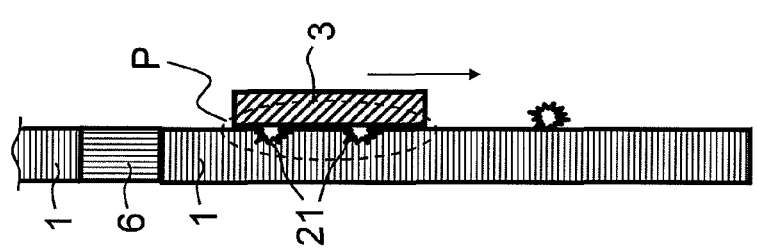
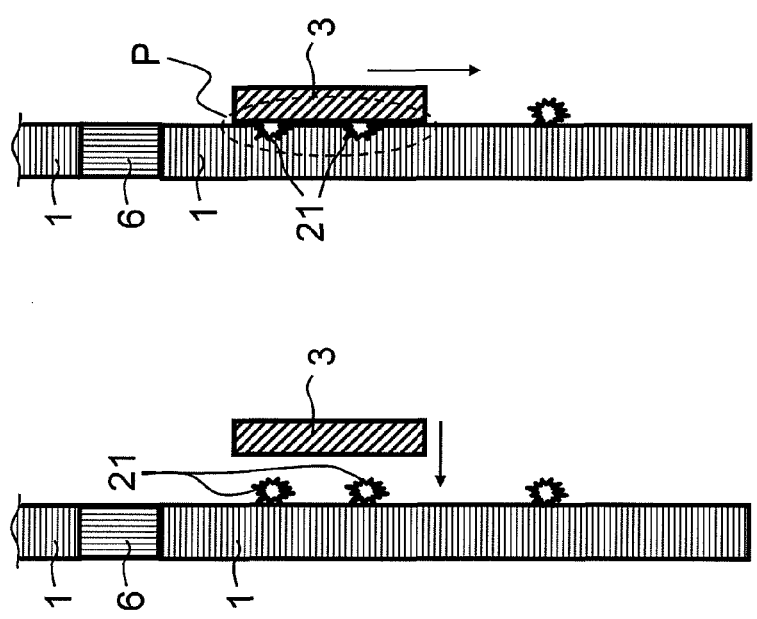

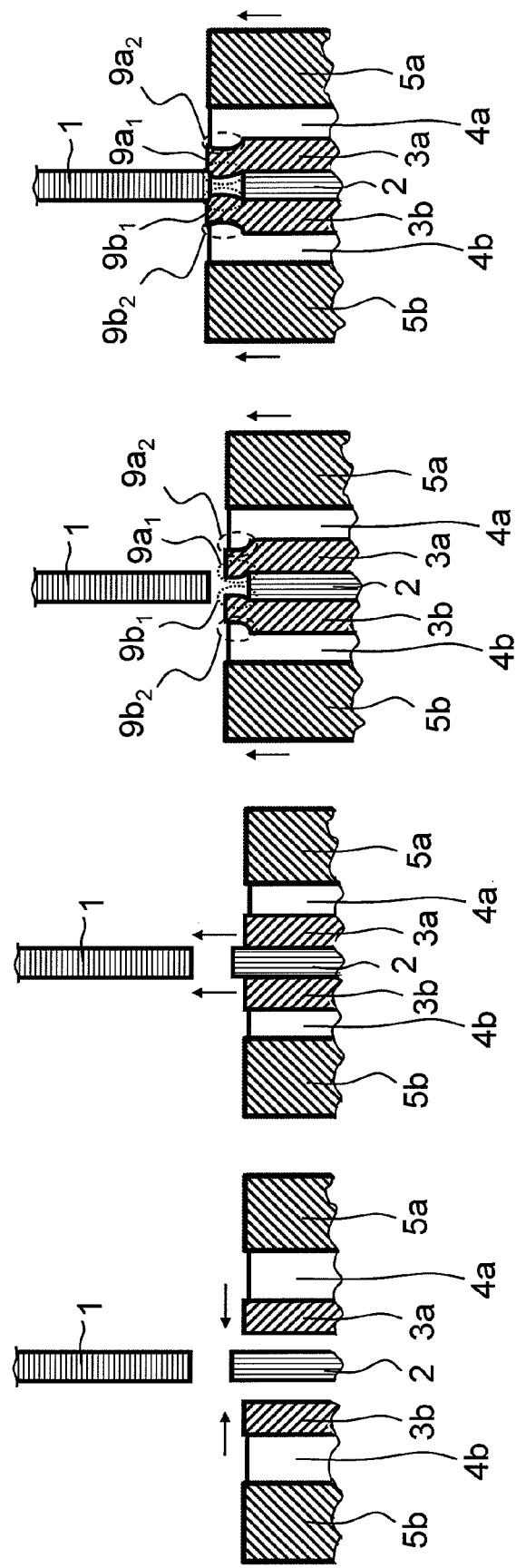

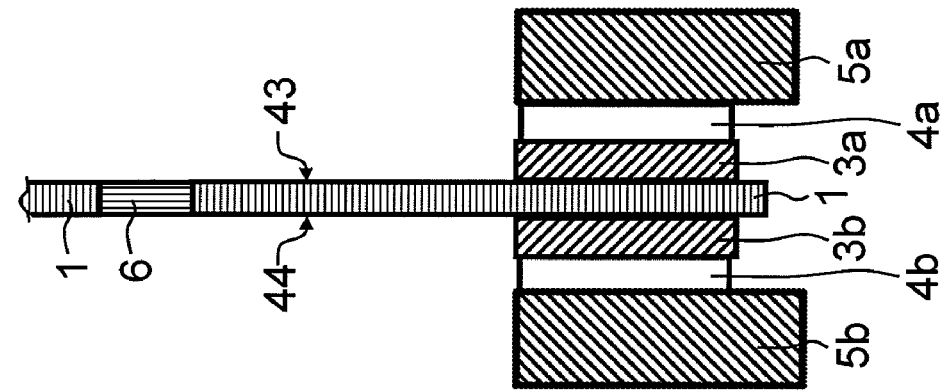
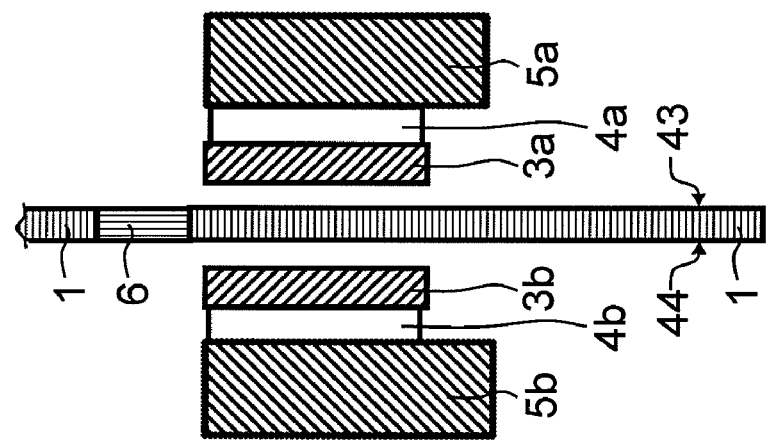
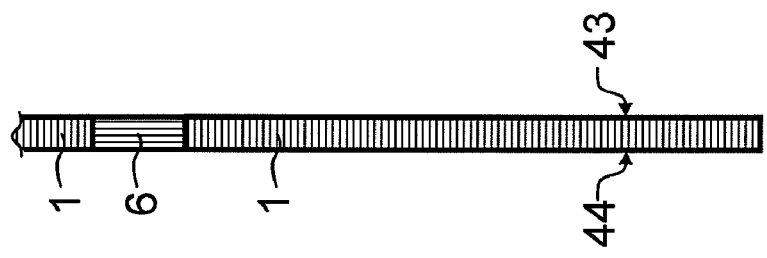

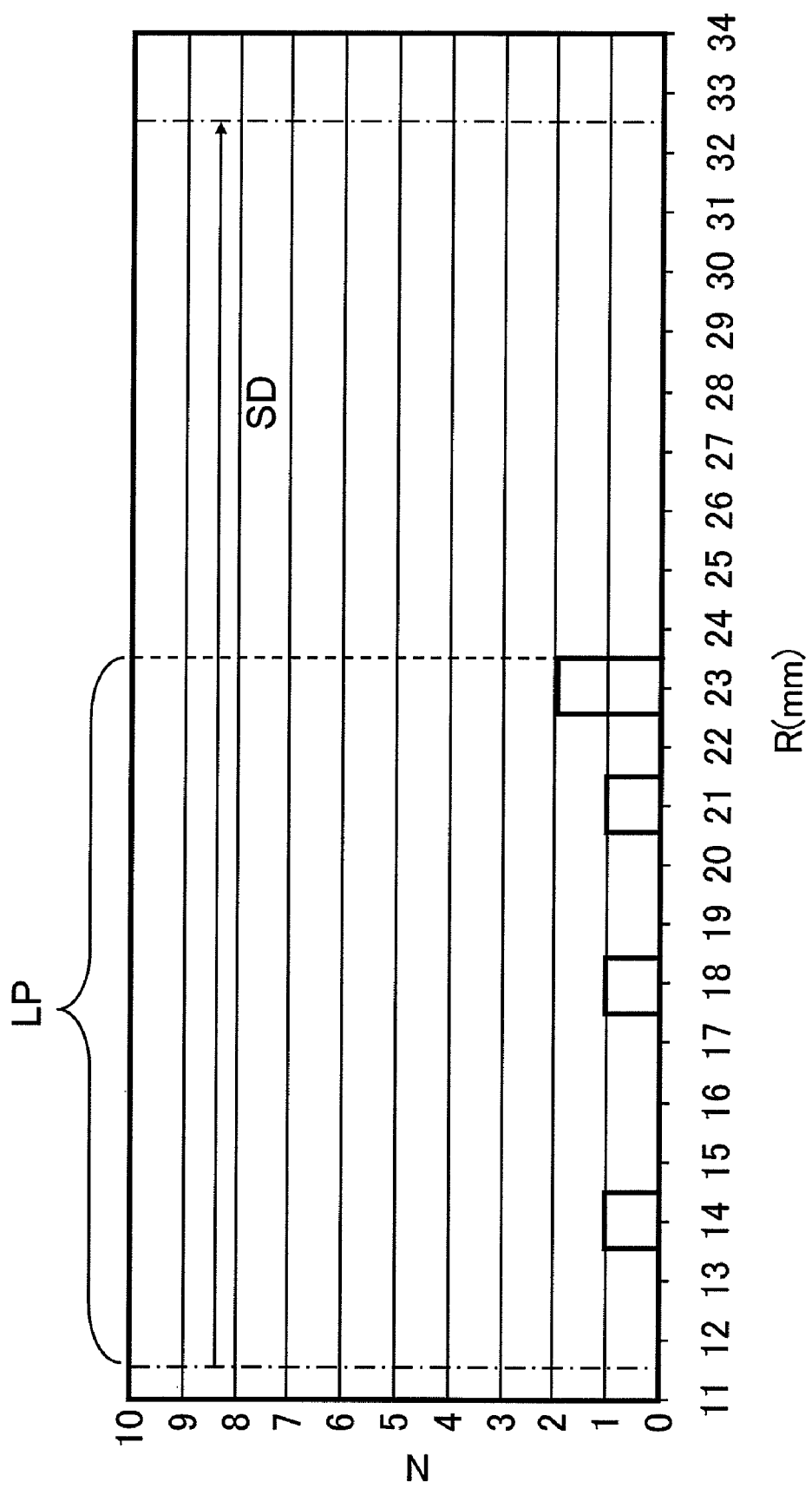

METHOD FOR MANUFACTURING STORAGE MEDIUM

BACKGROUND

This art relates to a method for manufacturing a storage medium.

Storage media for use in storage devices that can record and reproduce information are each produced by, for example, forming a magnetic film on a substrate, applying a lubricant to the resulting stack, and planarizing the stack to which the lubricant is applied. Planarization is performed in order to improve the floating stability of a magnetic head during the operation of a magnetic recording device and in order that the magnetic head not be damaged by foreign matter attached to the surface of a magnetic recording medium. Japanese Utility Model Registration Application Laid-Open Publication No. 60-60014 discusses such a storage medium, a storage device, and a method for manufacturing a storage medium.

SUMMARY

According to an aspect of an embodiment, a method for manufacturing a storage medium includes: providing a medium plate member for forming the storage medium and a guide member; aligning the medium plate member and the guide member so that the medium plate member and the guide member are placed adjacently and the surfaces of the medium plate member and the guide member form a substantially common plane; guiding a burnishing member for burnishing the medium plate member onto the surface of the guide member; and sliding the burnishing member on the guide member onto the medium plate member so as to burnish the surface of the medium plate member.

BRIEF DESCRIPTION OF THE DRAWINGS

FIGS. 1A to 1F are schematic cross-sectional views illustrating a method for manufacturing a storage medium according to an embodiment of the present invention;

FIG. 2 shows a schematic plan view and a schematic cross-sectional view of an example of a medium plate member prepared in a step of preparing the medium plate member having a recording layer;

FIG. 3 is a schematic cross-sectional view of another example of the medium plate member prepared in the step of preparing the medium plate member having a recording layer;

FIGS. 6A to 6C are cross-sectional views illustrating a step of bringing a burnishing member into contact with a guide member in a method for manufacturing a storage medium according to an embodiment of the present invention;

FIGS. 7A to 7D are schematic cross-sectional views of the positional relationship among a burnishing member, a guide member, and foreign matter attached to a surface of a medium plate member in a method for manufacturing a storage medium according to an embodiment of the present invention;

FIGS. 8A to 8C are schematic cross-sectional views of the positional relationship between a burnishing member and foreign matter attached to a surface of a medium plate member in the course of a method for manufacturing a magnetic recording medium according to the related art;

FIGS. 10A to 10D are schematic cross-sectional views illustrating a mechanism of the generation of flaws in the outermost periphery in Experimental Example 1;

FIGS. 12A to 12C are schematic cross-sectional views illustrating a method for manufacturing a magnetic recording medium in Comparative Example 1; and FIG. 13 is a bar graph showing the relationship between the positions and the number of the flaws in both surfaces of a magnetic recording medium produced in Comparative Example 1.

DESCRIPTION OF THE PREFERRED EMBODIMENTS

Typical means for planarizing a storage medium is tape burnishing (TB). Tape burnishing includes pressing a burnishing tape against the front side and the back side of a rotating magnetic recording medium and then sliding the burnishing tape on the surfaces of the magnetic recording medium to remove projections on the surfaces of the medium. To improve the flatness of the surfaces of the magnetic recording medium and remove foreign matter on the surfaces of the magnetic recording medium, tape burnishing is usually performed in the final step of a production process of the magnetic recording medium.

Tape burnishing disadvantageously results in flaws in the magnetic recording medium, thus adversely affecting magnetic recording and reproducing performance. The flaws are concentrated in a portion of the magnetic recording medium where the burnishing tape is first brought into contact with the medium. A small area of contact between the burnishing tape and the magnetic recording medium reduces the number of flaws. In this case, however, burnishing efficiency may be reduced.

The present invention provides a method for manufacturing a storage medium, the method including planarizing the storage medium without generating flaws that adversely affect information recording and reproducing performance.

FIGS. 1A to 1F is schematic cross-sectional views illustrating a method for manufacturing a magnetic recording medium as an embodiment of a method for manufacturing a storage medium according to the present invention.

Figure 1D:
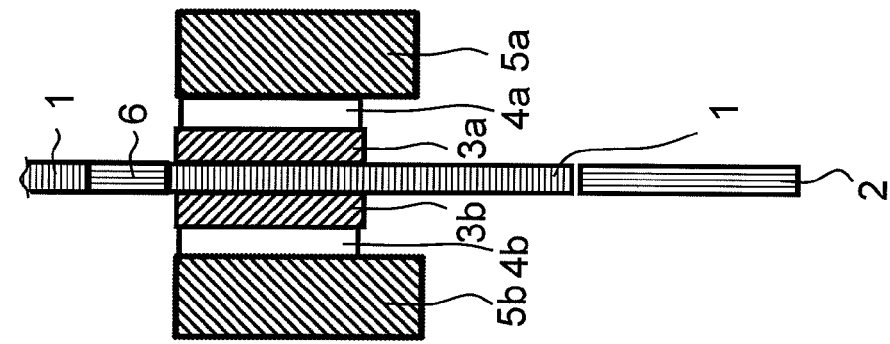
Figure 1E:
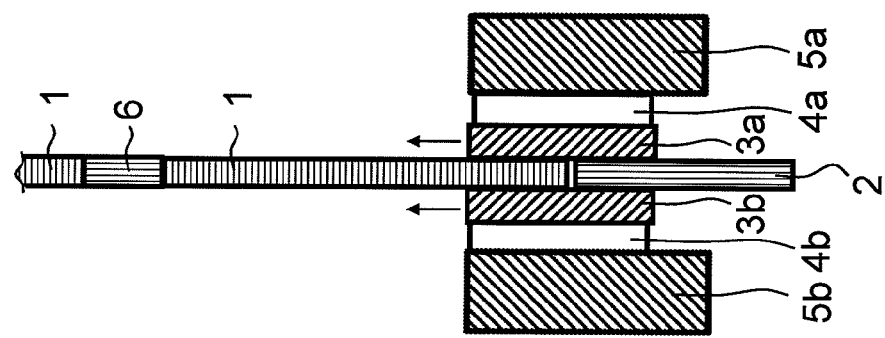
Figure 1F:
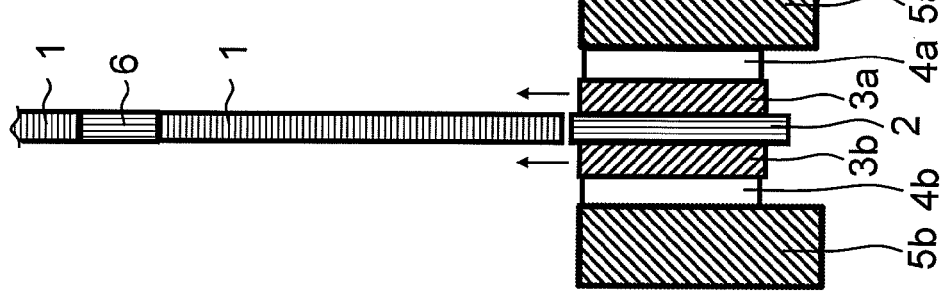

A method for manufacturing a magnetic recording medium according to an embodiment includes a step of providing a medium plate member (FIG. 1A), a step of aligning the medium plate member and the guide member so that the medium plate member and the guide member are placed adjacently and the surfaces of the medium plate member and the guide member form a substantially common plane (FIG. 1B), a step of guiding a burnishing member for burnishing the medium plate member onto the surface of the guide member (FIG. 1C to 1D), and a step of sliding the burnishing member on the guide member onto the medium plate member so as to burnish the surface of the medium plate member (FIG. 1D to 1F).

Steps of a method for manufacturing a magnetic recording medium according to an embodiment will be described below with reference to the attached drawings.

1. Step of Preparing Medium Plate Member

In this step, a medium plate member having a magnetic recording layer on a substrate is prepared. The medium plate member prepared in this step is subjected to planarization step described below to form a magnetic recording medium without irregularities or foreign matter on surfaces of the medium.

FIG. 2 shows a schematic plan view and a schematic cross-sectional view of an example of a medium plate member prepared in this step. A medium plate member 1 includes soft magnetic underlayers 12A and 12B, intermediate layers 13A and 13B, recording layers 14A and 14B, and protective layers 15A and 15B on surfaces of a substrate 11. Surfaces of the protective layers 15A and 15B are covered with lubricant layers 16A and 16B, respectively. The medium plate member 1 may have any shape in response to the shape of a target magnetic recording medium and is usually in the form of a disk.

The shape, the structure, the size, the material, and the like of the substrate 11 are not particularly limited but may be appropriately selected according to purpose. For example, when the magnetic recording medium is incorporated in a magnetic disk device, the substrate 11 is in the form of a disk. The substrate 11 may have a single-layer structure or a multiple layered structure. The substrate 11 may be composed of a material selected from known materials used as substrates for magnetic recording media.

The material can be selected from aluminum, glass, silicon, quartz, $SiO_2$/Si in which a thermal oxidation film is formed on a silicon surface ("/" indicates that the substrate materials in front of and next to "/" are stacked), and the like. These materials may be used alone or in combination. The substrate 11 may be appropriately formed. Alternatively, a commercially available substrate may be used as the substrate 11.

The shape, the structure, the size, and the like of each of the soft magnetic underlayers (SUL) 12A and 12B are not particularly limited but may be appropriately selected from those that have been used in the past according to purpose.

Each of the soft magnetic underlayers 12A and 12B may be preferably composed of at least one material selected from Ru, Ru alloys, NiFe, FeSiAl, FeC, FeCoB, FeCoNiB, and CoZrNb. These materials may be used alone or in combination.

The intermediate layers 13A and 13B are provided in order to improve the orientation of the recording layers 14A and 14B mainly in a perpendicular magnetic recording medium. The shape, the structure, the size, and the like of each of the intermediate layers 13A and 13B are not particularly limited but may be appropriately selected from those that have been used in the past according to purpose. Each of the intermediate layers 13A and 13B may be preferably composed of at least one material selected from Ni alloys, Ru, Ru alloys, and CoCr alloys containing oxides.

The recording layers 14A and 14B are provided in order to record and reproduce information in the magnetic recording medium.

The material for each of the recording layers 14A and 14B is not particularly limited but may be appropriately selected from known materials according to purpose. For example, each of the recording layers 14A and 14B may be preferably composed of at least one material selected from Fe, Co, Ni, FeCo, FeNi, CoNi, CoNiP, FePt, CoPt, and NiPt. These materials may be used alone or in combination.

The structure (shape) of each of the recording layers 14A and 14B is not particularly limited as long as the layers are formed as magnetic films each composed of the material described above. The structure (shape) may be appropriately selected according to purpose.

The thickness of each of the recording layers 14A and 14B is not particularly limited as long as advantages of the invention are not impaired. The thickness may be appropriately selected in response to linear recording density and the like during recording.

A method for forming the recording layers 14A and 14B is not particularly limited. The recording layers 14A and 14B may be formed by a known method, e.g., sputtering, electrodeposition, or AC plating.

The protective layers 15A and 15B are formed directly on the surfaces of the perpendicular recording layers 14A and 14B, respectively, by a known film-forming technique, e.g., sputtering or plating. The material constituting each of the protective layers 15A and 15B is not particularly limited. For example, diamond-like carbon (DLC) may be preferably used.

The surfaces of the protective layers 15A and 15B are subjected to cleaning. To improve durability and corrosion resistance, the surfaces of the protective layers 15A and 15B are treated with a lubricant 16 to afford the medium plate member 1. For example, a perfluoropolyether lubricant, which is a fluorocarbon lubricant having termini with various polar groups, is used as the lubricant 16 and is applied onto the protective layers 15A and 15B by dipping, spin coating, or spraying.

The shape, the structure, the size, the material, and the like of the medium plate member used in the method for manufacturing the storage medium according to the present invention are not particularly limited but may be appropriately selected according to purpose. For example, as shown in FIG. 3, a soft magnetic underlayer 12, an intermediate layer 13, a recording layer 14, and a protective layer 15 are formed on only one side of the substrate. Furthermore, the protective layer 15 may be covered with the lubricant 16. The medium plate member used in the method for manufacturing the storage medium may be appropriately formed. Alternatively, a commercially available medium plate member may be used as the medium plate member.

2. Step of Aligning Guide Member and Medium Plate Member

In this step, as shown in FIG. 1B, the medium plate member 1 and a guide member 2 are aligned in such a manner that the surfaces of the medium plate member 1 and the guide member 2 form a substantially common plane.

The middle of the medium plate member 1 is fixed to a spindle 6. The spindle 6 is an axis to fix and rotate the medium plate member 1. The medium plate member 1 and the guide member 2 are aligned in such a manner that a surface 41 of the guide member 2 mounted on a fixing member (not shown) and a surface 43 of the medium plate member 1 form a substantially common plane, and that a surface 42 of the guide member 2 and a surface 44 of the medium plate member 1 form a substantially common plane. In this arrangement, when a burnishing member is brought into contact with the medium plate member in the subsequent step, substantially no motion of the burnishing member takes place in the direction normal to the surface of the medium plate member. Hence, the burnishing member is brought into contact with the surfaces of the medium plate member without exerting a large impulsive force on the surfaces of the medium plate member. Thus, the burnishing member is unlikely to exert a large impulsive force on foreign matter attached to the surfaces of the medium plate member, such a force potentially damaging the medium plate member. In this arrangement of the medium plate member and the guide member, therefore, the burnishing member burnishes the surfaces with negligible generation of flaws due to the impulsive force.

The guide member 2 is aligned to smoothly slide the burnishing member brought into contact with the guide member 2 onto the medium plate member in the subsequent steps.

In known tape burnishing, the burnishing member is directly brought into contact with the medium plate member 1; hence, foreign matter attached to the surfaces of the medium plate member disadvantageously causes flaws in wide areas of the surfaces of the medium plate member because of an impulsive force generated in contacting them. The flaws adversely affect the magnetic recording and reproducing performance of the resulting magnetic recording medium. In this embodiment, this problem is eliminated by bringing the burnishing member into contact with the surfaces 41 and 42 of the guide member 2 and then sliding the contacted burnishing member on the surfaces 43 and 44. Details will be described in "Step of Sliding Burnishing Member on Guide Member and Medium plate member" described below.

In the method for manufacturing a storage medium according to the present invention, the expression "a substantially common plane" indicates that preferably, the surfaces form completely a common plane, however, the surfaces may not form completely a common plane but may form a step within a rational range in which the purpose of the invention is achieved. In other words, in the step of sliding the burnishing member on the guide member and the medium plate member as described below, the surfaces 41 and the surface 43 may not form completely a common surface, and the surface 42 and the surface 44 may not form completely a common surface as long as the burnishing member in contact with the guide member can slide smoothly on the medium plate member without generating a large impulsive force against the medium plate member. The height of the step formed between the surfaces 41, 42 and the surfaces 43, 44 is preferably 35 μm or less and more preferably 25 μm or less.

Figure 11A:
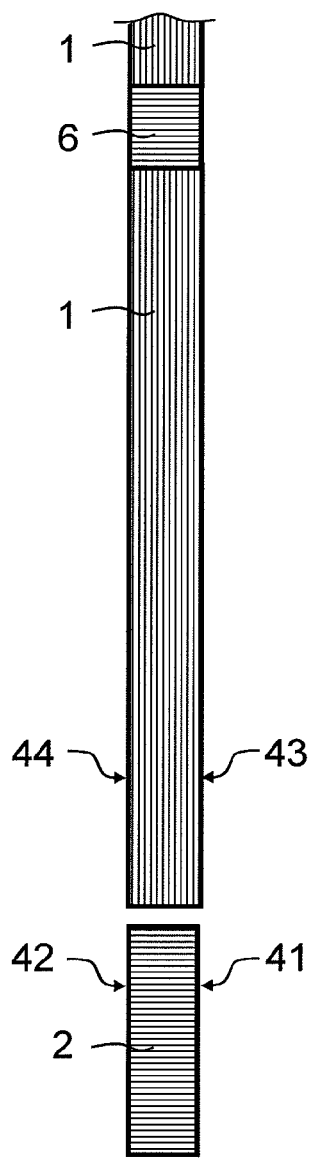
FIGS. 11A to 11C are schematic cross-sectional views illustrating a method for manufacturing a magnetic recording medium in Experimental Example 2.
Figure 11B:
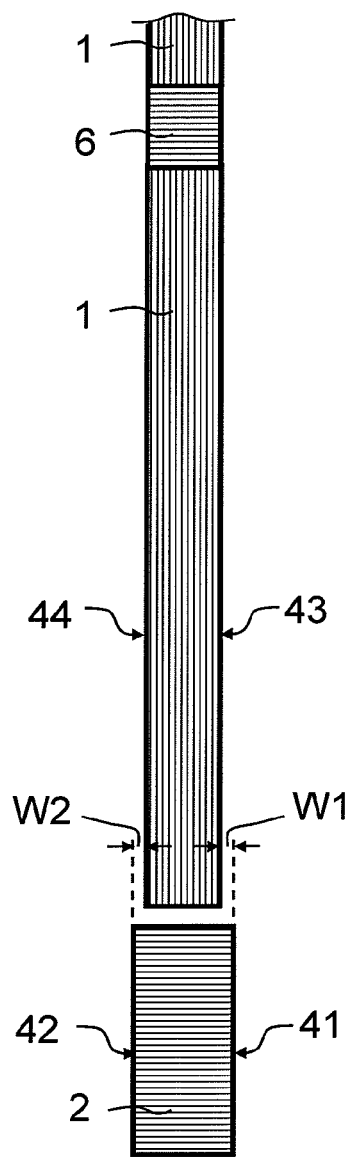
Figure 11C:
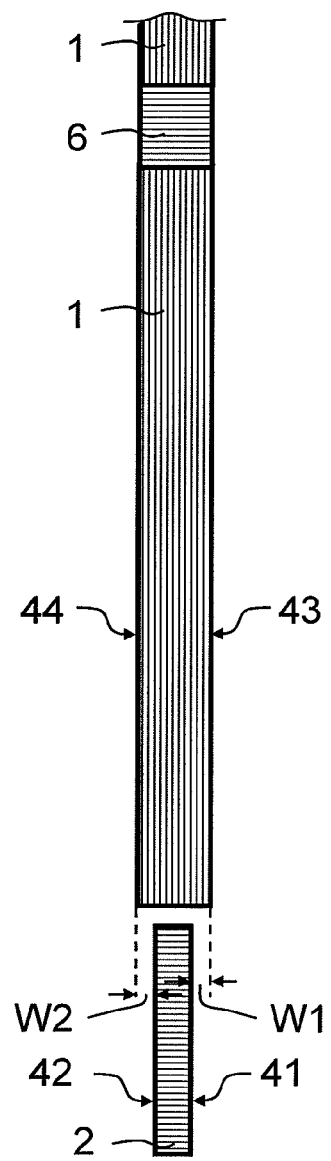

FIGS. 11A to 11C are schematic cross-sectional views illustrating an embodiment in which the medium plate member 1 and the guide member 2 are aligned in such a manner that each of the surfaces of the medium plate member 1 and a corresponding one of the surfaces of the guide member 2 form a substantially common plane. For example, the guide member 2 may have a thickness slightly larger than that of the medium plate member 1 as shown in FIG. 11B as well as an arrangement in which each of the surfaces 41 and the surface 43 form a common plane, and the surface 42 and the surface 44 form a common plane as shown in FIG. 11A. Alternatively, as shown in FIG. 11C, the guide member 2 may have a thickness slightly smaller than that of the medium plate member 1. Specifically, in FIGS. 11B and 11C, each of the distance W1 between the surface 41 and the surface 43 and the distance W2 between the surface 42 and the surface 44 may vary in response to the shape, the surface area, and the like of a burnishing member 3 and is preferably 35 μm or less and more preferably 25 μm or less.

The medium plate member and the guide member preferably have flat surfaces. In the step of sliding the burnishing member on the guide member and the medium plate member described below, the medium plate member and the guide member may have irregular surfaces as long as the burnishing member in contact with the guide member can slide smoothly on the medium plate member without generating a large impulsive force against the medium plate member. The surfaces of the medium plate member are preferably parallel to the surfaces of the guide member but may not be completely parallel to the surfaces of the guide member.

The difference in thickness between the guide member 2 and the medium plate member 1 is preferably 35 μm or less and more preferably 25 μm or less in order that the surfaces 41 of the guide member 2 and the surfaces 43 of the medium plate member 1 may form substantially a common plane, and the surfaces 42 of the guide member 2 and the surfaces 44 of the medium plate member 1 may form substantially a common plane, the medium plate member 1 having the recording layers 14A and 14B on both sides of the substrate 11. Particularly preferably, the guide member 2 has substantially the same thickness as that of the medium plate member 1.

In the case where the difference in thickness between the guide member 2 and the medium plate member 1 is in the above range, the impulsive force generated in bringing the burnishing member into contact with the medium plate member is small in the step of sliding the burnishing member on the guide member and the medium plate member. Thus, the surfaces of the medium plate member are burnished while the generation of flaws are prevented.

The material for the guide member 2 is not particularly limited as long as the guide member 2 does not break or easily deform while the guide member 2 is in contact with the burnishing member. Examples of the material that can be used include tungsten, carbon, and alloys such as cobalt-containing cemented carbides, stainless steel, and brass.

Figure 4:
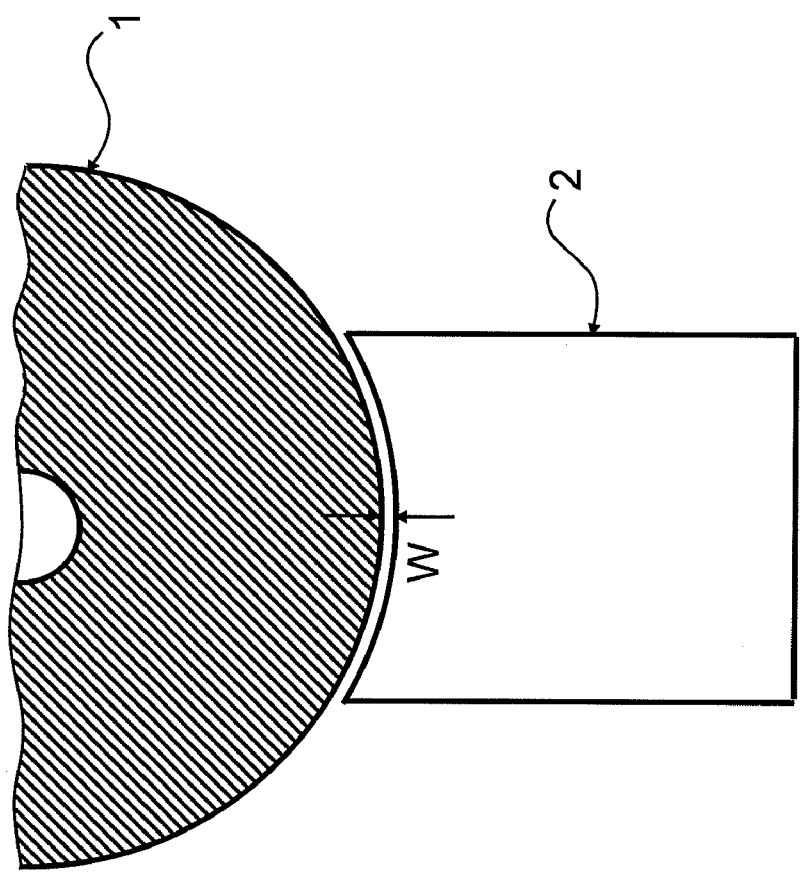
FIG. 4 is a schematic plan view of an example of the arrangement and shapes of a guide member and a medium plate member in a step of arranging the guide member and medium plate member.

FIG. 4 is a schematic plan view of the arrangement of the medium plate member 1 and the guide member 2 in FIG. 1B. In this embodiment, the interval W between the medium plate member 1 and the guide member 2 is not particularly limited. From the viewpoint of achieving smooth sliding of the contacted burnishing member onto the medium plate member, the interval W is preferably smaller than the width of the burnishing member. More preferably, the interval W is as small as possible. However, the interval W is preferably 1 mm or more from the viewpoint of preventing the contact between the medium plate member 1 and the guide member 2 due to the eccentricity of the spindle 6 and the installation error of the guide member 2.

The shape, the structure, the size, the material, and the like of the fixing member (not shown) are not particularly limited.

Figure 5:
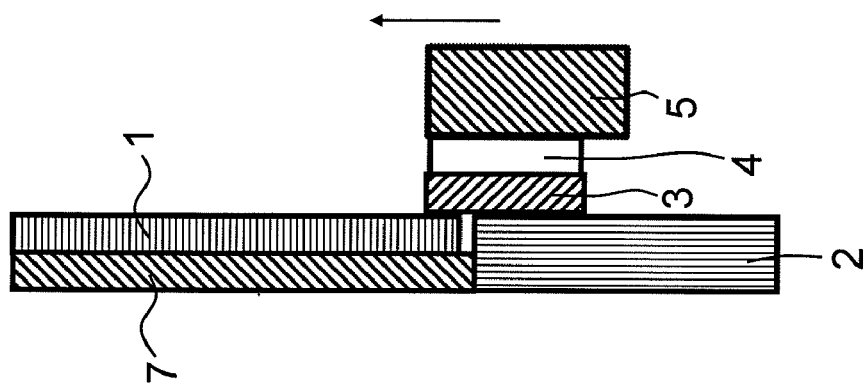
FIG. 5 is a schematic plan view of another example of the arrangement and the shapes of the guide member and the medium plate member in the step of arranging the guide member and medium plate member.

In the step of aligning a guide member and a medium plate member in the method for manufacturing a storage medium according to the present invention, the guide member 2 may be aligned in such a manner that at least one surface of the guide member 2 and a corresponding one of the surfaces of the medium plate member 1 form a substantially common plane. For example, in the case where the medium plate member having the recording layer and the like on one side of the substrate as shown in FIG. 3 is used in this step, the medium plate member 1 and the guide member 2 may be aligned with a jig 7 such that the surface on which the recording layer of the medium plate member 1 is provided and the corresponding surface of the guide member 2 form a substantially common plane as shown in FIG. 5. The shape, the structure, the size, the material, and the like of the jig 7 are not particularly limited.

3. Step of Bringing Burnishing Member into Contact with Guide Member

In this step, as shown in FIGS. 1C and 1D, the burnishing member 3 for burnishing the surfaces of the medium plate member 1 is brought into contact with the guide member 2.

The burnishing member 3 includes burnishing layers having fixed abrasive grains and can burnish the surfaces of the medium plate member 1. The burnishing layers usually have the abrasive grains fixed by means of a resin binder.

FIGS. 6A to 6C are schematic cross-sectional views illustrating an example of the step of bringing the burnishing member into contact with the guide member in the method for manufacturing a storage medium according to this embodiment. As shown in FIG. 6A, burnishing tapes 3a and 3b (hereinafter, also collectively referred to as a "burnishing tape 3") serving as burnishing members to burnish both surfaces of the medium plate member 1 and including burnishing layers provided on sheets such as plastic films are aligned on both sides of the medium plate member 1. The burnishing tape 3 is preferably used in view that the medium plate member 1 can be burnished with unused burnishing layers by unwinding the burnishing tapes 3a and 3b from rolls 31a and 31b (hereinafter, also collectively referred to as a "roll 31"), respectively, and winding the burnishing tapes 3a and 3b around rolls 32a and 32b (hereinafter, also collectively referred to as a "roll 32"), respectively, every time one magnetic recording medium is produced. Furthermore, in the subsequent step of sliding the burnishing member onto the guide member and the medium plate member, sliding may be performed while the burnishing tape 3 is continuously unwound from the roll 31 and wound around the roll 32. Alternatively, sliding may be performed while the burnishing tape 3 is stopped. The direction of the feed of the burnishing tape 3 from the roll 31 to the roll 32 is not particularly limited and may be a radial direction of the medium plate member that is in the form of a disk or may be a direction perpendicular to a radial direction of the medium plate member.

The plastic films usually have a thickness of about 5 to 100 μm. As the abrasive grains, for example, particles composed of at least one material selected from alumina, diamond, silica, ceria, iron oxide, chromium oxide, and silicon carbide and having an average particle diameter of 0.02 to 5 μm may be used. As the resin binder, for example, a polyester or polyurethane resin binder may be used.

In the subsequent step, the surfaces of the medium plate member 1 can be burnished by bringing the burnishing tape 3 into contact with both sides of the medium plate member 1 and pressing the burnishing tape 3 against the medium plate member 1. Means for pressing the burnishing tape 3 is not particularly limited and may include, for example, arranging TB pads 4a and 4b (hereinafter, also collectively referred to as a "TB pad 4") and TB heads 5a and 5b (hereinafter, also collectively referred to as a "TB head 5") on respective sides of the burnishing tapes 3a and 3b opposite the burnishing layers and then applying forces Fa and Fb to the TB heads 5a and 5b to press the burnishing tapes 3a and 3b with the TB pads 4a and 4b against both surfaces of the medium plate member 1, as shown in FIG. 6A. Examples of the material for the TB pad 4 include various resin materials, such as urethane elastomers, ethylene elastomers, and nonrigid plastic. Examples of the material for the TB head 5 include various alloys such as stainless steel and brass. The shapes and sizes of the TB pad 4 and the TB head 5 may be appropriately selected in accordance with the size of the magnetic recording medium to be produced.

In the step of bringing the burnishing member into contact with the guide member in the method for manufacturing the storage medium of the present invention, the burnishing tapes 3ab for burnishing the surfaces of the medium plate member 1 may be brought into contact with the guide member 2. For example, in the case where the medium plate member having the recording layer and the like on one side of the substrate as shown in FIG. 3 is used in this step, means in which the burnishing tape 3, the TB pad 4, and the TB head 5 are aligned on one side of the medium plate member 1 and in which a force F is then applied to the TB head 5 to press the burnishing tape 3 with the TB pad 4 against one side of the medium plate member 1 may be employed as shown in FIG. 6B.

As another means for pressing the burnishing tape 3, for example, means for pressing the burnishing tape 3 against a surface of the medium plate member 1 by blowing compressed air 40 on a side of the burnishing tape 3 opposite the burnishing layer may be employed as shown in FIG. 6C. A force having the same strength as the force F is exerted by any means in the direction opposite to the direction of the force F (not shown in FIGS. 6B and 6C).

4. Step of Sliding Burnishing Member onto Guide Member and Medium Plate Member

In this step, as shown in FIGS. 1D to 1F, the burnishing member 3 in contact with the guide member 2 is slid onto the guide member 2 and the medium plate member 1 to burnish the surfaces of the medium plate member 1. The burnishing member 3 is slid from the guide member 2 aligned on the peripheral side of the medium plate member 1 toward the inner periphery of the medium plate member 1. However, the burnishing member 3 may be shuttled in the radius direction, as needed. Usually, the medium plate member 1 is usually rotated by rotating the spindle 6 during the sliding, thereby more uniformly burnishing the surfaces. In the case where the burnishing member 3 is the burnishing tape as shown in FIGS. 6A to 6C, the burnishing tape 3 may be continuously fed or stopped during the sliding.

FIGS. 7A to 7D are schematic cross-sectional views of the positional relationship among the burnishing member, the guide member, and foreign matter attached to a surface of the medium plate member in the course of the method for manufacturing the magnetic recording medium according to this embodiment. FIG. 7A shows the positional relationship among the burnishing member, the guide member, the medium plate member, and the foreign matter immediately before the burnishing member is brought into contact with the guide member. FIG. 7B shows the positional relationship among the burnishing member, the guide member, the medium plate member, and the foreign matter immediately after the burnishing member is brought into contact with the guide member. FIGS. 7C and 7D each show the positional relationship among the burnishing member, the guide member, the medium plate member, and the foreign matter during the sliding of the burnishing member in contact with the guide member toward the inner periphery of the medium plate member.

When the burnishing tape 3 is brought into contact with the surface of the guide member 2 to which foreign matter 21 is attached, in some cases, an impulsive force exerted at the moment of the contact causes flaws according to the shape of the foreign matter 21 as shown in FIG. 7B. The foreign matter 21 embedded in flaws does not cause surface flaws of the medium plate member 1 during the sliding toward the inner periphery of the medium plate member 1.

The surface of the medium plate member 1 and the corresponding surface of the guide member 2 form a substantially common plane. Thus, when the burnishing member 3 is brought into contact with the medium plate member, substantially no motion of the burnishing member takes place in the direction normal to the surface of the medium plate member. Hence, the burnishing member is brought into contact with the surface of the medium plate member without generating a large impulsive force against the surface of the medium plate member. Therefore, even when the sliding is performed while the foreign matter 21 that has been attached to the surface of the guide member is attached to the surface of the burnishing tape, the foreign matter 21 is not subjected to an impulsive force, so that the generation of flaws in the surface of the medium plate member 1 is suppressed. Also, foreign matter 22 attached to the medium plate member 1 is not subjected to an impulsive force during the sliding and thus does not cause flaws in the medium plate member 1.

The foreign matter 21 and the foreign matter 22 are fine particles resulting from fine particles deposited inside a production apparatus in forming the layers constituting the medium plate member 1 in the step of preparing the medium plate member 1. The size of the foreign matter that causes flaws in the medium plate member 1 is about 10 µm or more under the present circumstances.

In this embodiment, to improve burnishing efficiency of the surface of the medium plate member 1, the contact area between the burnishing member 3 and the medium plate member 1 may be increased. The same effect as in this embodiment can be provided even when the contact area between the burnishing member 3 and the medium plate member 1 is reduced. However, the burnishing efficiency is reduced.

FIGS. 8A to 8C are schematic cross-sectional views of the positional relationship between the burnishing member 3 and the foreign matter attached to the surface of the medium plate member in the course of a method for manufacturing a magnetic recording medium according to the related art, the method including a step of bringing the burnishing member 3 into contact with the medium plate member 1 without a guide member. FIG. 8A shows the positional relationship among the burnishing member, the medium plate member, and the foreign matter immediately before the burnishing member is brought into contact with the medium plate member. FIG. 8B shows the positional relationship among the burnishing member, the medium plate member, and the foreign matter immediately after the burnishing member is brought into contact with the medium plate member. FIG. 8C shows the positional relationship among the burnishing member, the medium plate member, and the foreign matter during the sliding of the burnishing member in contact with the medium plate member from the inner periphery to the outer periphery. When the burnishing tape 3 is brought into contact with the surface of the medium plate member 1 to which foreign matter 22 is attached, in some cases, an impulsive force exerted at the moment of the contact causes flaws according to the shape of the foreign matter 22 as shown in FIG. 8B. An increase in the contact area between the burnishing member 3 and the medium plate member 1 in order to improve burnishing efficiency may increase the probability that the foreign matter will be sandwiched between the burnishing member 3 and the medium plate member 1, thereby facilitating the generation of flaws. The foreign matter 22 embedded in flaws does not cause surface flaws of the medium plate member 1 during the sliding toward the outer periphery of the medium plate member 1. Substantially no motion of the burnishing member takes place in the direction normal to the surface of the medium plate member, so that the burnishing member does not exert a large impulsive force on the surface of the medium plate member. Therefore, even when the sliding is performed while foreign matter is attached to the surface of the tape, the generation of flaws at a portion of the surface of the medium plate member 1 other than a portion P (FIGS. 8B and 8C) where the burnishing tape 3 is brought into contact with the surface of the medium plate member 1 is suppressed.

After the above step, if necessary, a tape formed of foam, a woven fabric, a nonwoven fabric, a flocked fabric, or a raised fabric may be pressed against the surface of the soft magnetic underlayers on both sides of the rotary substrate to wipe the surfaces of the soft magnetic underlayers, thereby removing foreign matter such as burnishing dust attached to the surfaces of the soft magnetic underlayers during the burnishing. Furthermore, after the burnishing, foreign matter such as burnishing dust attached to the surfaces of the soft magnetic underlayers during the burnishing with the fixed abrasive grains may be removed by blowing water or air onto the surfaces of the medium plate member 1.

The present invention is not limited to the exemplary embodiments described above. Any equivalent having substantially the same technical ideas as those described in the appended claims of the present invention and providing the same effects is intended to be embraced in the technical range of the present invention.

For example, in this embodiment, the magnetic recording layer is used as the recording layer. In the storage medium of the present invention, however, a recording layer that serves to record and reproduce information suffices as the recording layer. The recording layer is not limited to the magnetic recording layer.

According to the above mentioned embodiments, the burnishing member exerts a large impulsive force not on the medium plate member having the recording layer but on the guide member. Furthermore, the surface of the guide member with which the burnishing member is brought into contact and the surface of the medium plate member the surface of the medium plate member form a substantially common plane, so that substantially no motion of the burnishing member takes place in the direction normal to the surface of the medium plate member. Thus, the burnishing member slides on the medium plate member without exerting a large impulsive force on the surface of the medium plate member. In addition, the contact area between the burnishing member and the medium plate member may be increased. Thereby, a smooth storage medium that does not adverse affect the performance of recording and reproducing information is provided.

EXPERIMENTAL EXAMPLE 1

Soft magnetic underlayers composed of an antiferromagnetic material selected from Ru or Ru alloys, intermediate layers composed of a material selected from Ni alloys, Ru alloys, and CoCr alloys containing oxides, recording layers composed of a ferromagnetic material selected from Co, Ni, Fe, Co alloys, Ni alloys, and Fe alloys, and protective films composed of diamond-like carbon (DLC) were formed, in that order, by sputtering on respective surfaces of a glass substrate having a thickness of 0.635 mm and a diameter of 65 mm. The soft magnetic underlayers, the intermediate layers, the recording layers, and the protective films each had a thickness on the order of submicrons. The glass substrate including the stacked soft magnetic underlayers, intermediate layers, recording layers, and protective films was immersed in a lubricant (organic liquid having a main chain composed of perfluoropolyether and end groups such as hydroxy and phenyl groups) to apply the lubricant (thickness: 0.8 nm) onto the protective films, thereby affording a medium plate member in the form of a disk having a diameter of 65 mm as shown in FIG. 2. The total thickness of the medium plate member was 0.635 mm.

The resulting medium plate member was mounted on a spindle of a tape-burnishing apparatus (commercially available burnisher). FIG. 11A is a schematic cross-sectional view showing the positional relationship between the medium plate member and a guide member aligned in the tape-burnishing apparatus. The tape-burnishing apparatus had the guide member 2 having the same thickness as the total thickness of the medium plate member 1 and was designed to arrange the medium plate member 1 and the guide member 2 in such a manner that the surfaces 43 of the medium plate member 1 and the surfaces 41 of the guide member 2 form a substantially common plane, and the surfaces 44 of the medium plate member 1 and the surfaces 42 of the guide member 2 form a substantially common plane, the medium plate member 1 being mounted on the spindle 6.

The interval (interval W in FIG. 4) between the medium plate member and the guide member was fixed to be 1 mm. The tape-burnishing apparatus included burnishing tapes (manufactured by Mipox International Corp.), TB pads for pressing the burnishing tapes against the medium plate member and composed of polyurethane (trade name: Rubycell, manufactured by Toyopolymer Co., Ltd.), and TB heads composed of cemented carbide (G2) (tungsten, carbon, cobalt), these components being aligned as shown in FIG. 6A. The burnishing tape 3 was continuously unwound from the roll 31 and wound around the roll 32. The direction of the feed of the burnishing tape 3 from the roll 31 to the roll 32 was a direction perpendicular to a radial direction of the medium plate member having a disk shape.

In the tape-burnishing apparatus, the burnishing tape 3 was brought into contact with the guide member 2. The contact speed of the burnishing tape 3 to the surface of the guide member 2 was set at 0.5 mm/s.

Burnishing of the surfaces of the medium plate member 1 was performed by sliding the burnishing tape 3 in contact with the guide member 2 toward the inner periphery of the medium plate member 1 while the medium plate member 1 was rotated at a constant number of revolutions, thereby affording a magnetic recording medium. The burnishing tape 3 applied a constant load to the guide member and the medium plate member 1. The sliding speed (traverse speed) was set at 3 mm/s. The position where the application of a load was initiated was set on the surface of the guide member 2. The position where the application of the load was terminated was set at a position located on the surface of the medium plate member 1 and 12.0 mm away from the center of the medium plate member 1. During the sliding, the burnishing tape 3 was not wound around the roll 32.

Figure 9:
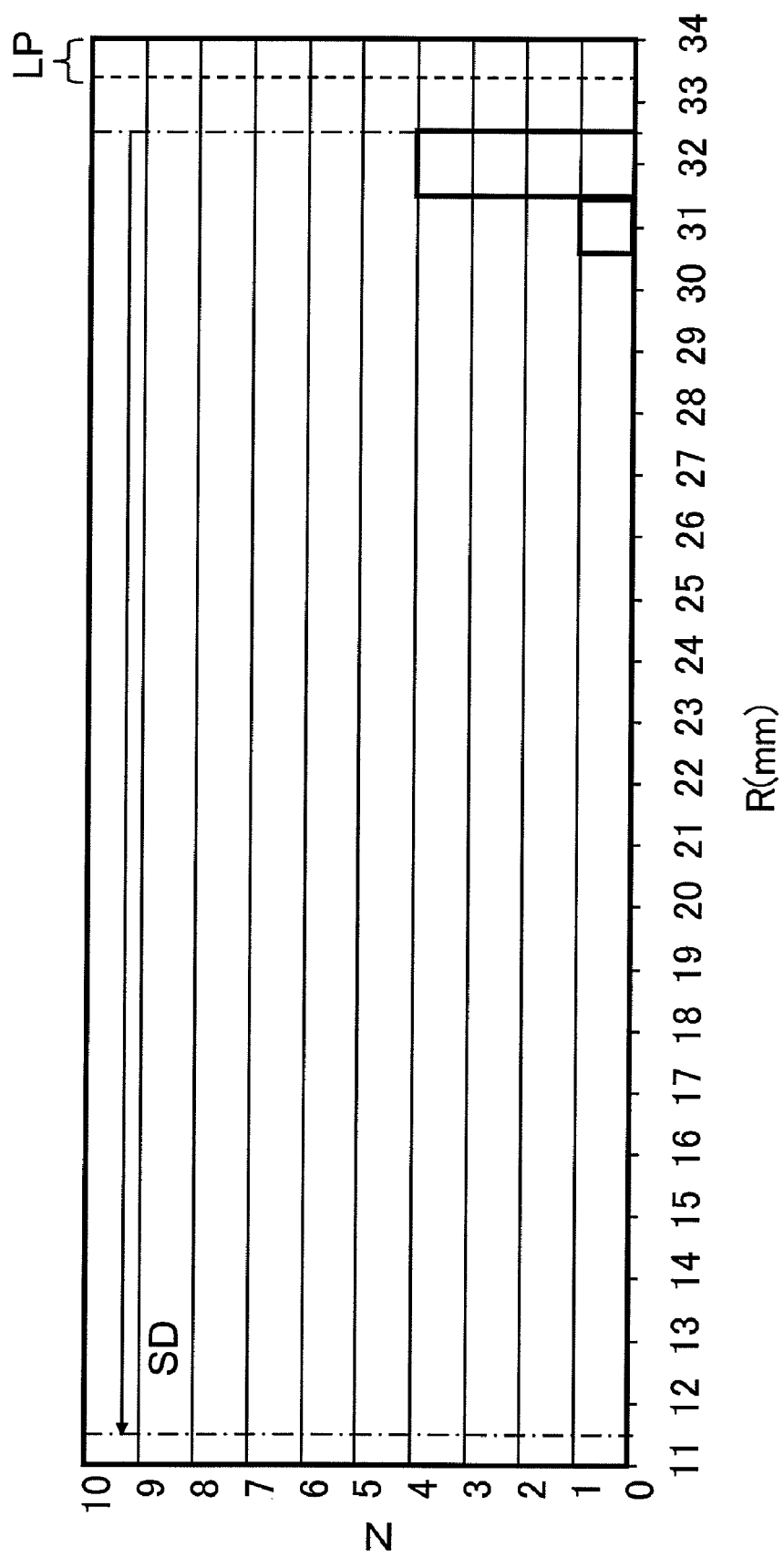
FIG. 9 is a bar graph showing the relationship between the positions of flaws and the number of flaws in a magnetic recording medium produced in Experimental Example 1.

According to the method described above, ten magnetic recording media were made. The positions of flaws and the number of flaws in the surfaces of the resulting magnetic recording media were observed with a microscope, provided that the flaws each having a width of 10 µm or more were counted. FIG. 9 shows the observational results of the positions of flaws and the number of flaws in both surfaces of the magnetic recording media. The horizontal axis of the graph of FIG. 9 represents the distance R (mm) from the center of the medium plate member. For example, the bar located at 31.5 to 32.5 mm along the horizontal axis represents the total number of flaws in a portion 31.5 to 32.5 mm away from the center of the medium plate member.

The vertical axis of the graph of FIG. 9 represents the total number N of flaws in both surfaces of ten magnetic recording media. In FIG. 9, "LP" represents the position (load position) where the application of the load to the medium plate member 1 is initiated, and "SD" represents the slide direction. Five flaws were observed in the portion (outermost periphery) 30.5 to 32.5 mm away from the center of the magnetic recording medium. No flaw was observed in another portion of the surfaces of the magnetic recording medium. The flaws may be often negligible because usually, the portion about 1 to 2 mm away from the outermost periphery is not used as a recording region.

The cause of the generation of flaws in the portion 30.5 to 32.5 mm away from the center is presumed as follows. FIGS. 10A to 10D are schematic cross-sectional views illustrating a mechanism of the generation of flaws in the outermost periphery in Experimental Example 1. FIG. 10A is a schematic cross-sectional view of the shapes of and positional relationship among the guide member 2, the burnishing tape 3, the TB pad 4, and the TB head 5 before the burnishing tape 3 is brought into contact with the guide member 2. FIG. 10B is a schematic cross-sectional view of the shapes of and positional relationship among the guide member 2, the burnishing tape 3, the TB pad 4, and the TB head 5 after the burnishing tape 3 is brought into contact with the guide member 2. FIG. 10C is a schematic cross-sectional view of the shapes of and positional relationship among the medium plate member 1, the guide member 2, the burnishing tape 3, the TB pad 4, and the TB head 5 when an edge $9a_1$ and $9b_1$ reach the gap between the guide member 2 and the medium plate member 1 in the course of the sliding of the burnishing tape 3. FIG. 10D is a schematic cross-sectional view of the shapes of and positional relationship among the medium plate member 1, the guide member 2, the burnishing tape 3, the TB pad 4, and the TB head 5 when the edges $9a_1$ and $9b_1$ reach the outermost periphery of the medium plate member 1 in the course of the sliding of the burnishing tape 3.

As shown in FIG. 10B, the burnishing tape 3 maintains a constant load applied to the guide member 2 immediately after the initiation of the sliding of the burnishing tape 3. At this time, the TB pad 4 is subjected to loads from the burnishing tape 3 and the TB head 5. The loads maintain the TB pad 4 in a more compressed state than a state before the burnishing tape 3 is brought into contact with the medium plate member 1 (FIG. 10A).

As shown in FIG. 10C, when end portions $9a_1$ and $9b_1$ of the burnishing tape 3 reach the gap between the guide member 2 and the medium plate member 1, the loads applied to end portions $9a_2$ and $9b_2$ of the TB pad 4 adjacent to the end portions $9a_1$ and $9b_1$ of the burnishing tape 3 are relieved respectively, thereby expanding the end portions of the TB pad 4.

In the case where sliding is continued, as shown in FIG. 10D, the expansions of the end portions $9a_2$ and $9b_2$ of the TB pad 4 results in the protrusions of the end portions $9a_1$ and $9b_1$ of the burnishing tape 3 with respect to the surfaces of the medium plate member 1 at the moment the end portions $9a_1$ and $9b_1$ of the burnishing tape 3 reach the outermost periphery of the medium plate member 1. When sliding is continued in this state, the medium plate member 1 is overloaded by the end portions $9a_1$ and $9b_1$ of the burnishing tape 3, thereby causing flaws in the medium plate member 1.

When sliding is further continued, the end portions $9a_2$ and $9b_2$ of the TB pad 4 are compressed again, so that the load applied to the medium plate member 1 by the end portions $9a_1$ and $9b_1$ of the burnishing tape 3 returns to normal. Therefore, flaws are not observed in the portion except the outermost periphery.

EXPERIMENTAL EXAMPLE 2

Relationship Between Flaw Generation Rate at Outermost Periphery of Medium Plate Member and Difference in Thickness of Medium Plate Member and Guide Member To evaluate the relationship between the flaw generation rate at the outermost periphery of the medium plate member and the difference in thickness of the medium plate member and the guide member of the tape-burnishing apparatus, magnetic recording media A, B, and C described below were produced.

As in Experimental Example 1, 13 magnetic recording media each having a layer structure, a shape, and a size identical to those of the medium plate member were produced. These magnetic recording media are referred to as "magnetic recording media A". FIG. 11A is a cross-sectional view showing the positional relationship between the medium plate member 1 and the guide member 2 when the medium plate member 1 is mounted on the spindle 6.

The tape-burnishing apparatus used in Experimental Example 1 was modified in such a manner that the guide member 2 had a thickness 50 µm larger than that of the medium plate member 1 and that the medium plate member 1 was aligned in such a manner that the distance (interval) between each of the surfaces of the medium plate member 1 mounted on the spindle 6 and a corresponding one of the surfaces of the guide member 2 (W1 and W2 in FIG. 11B) was 25 µm. FIG. 11B is a schematic cross-sectional view showing the positional relationship between the medium plate member 1 and the guide member 2 when the medium plate member 1 is mounted on the spindle 6 of this tape-burnishing apparatus. Thirteen magnetic recording media were produced as in Experimental Example 1, except that this apparatus was used. These magnetic recording media are referred to as "magnetic recording media B".

Next, the tape-burnishing apparatus used in Experimental Example 1 was modified in such a manner that the guide member 2 had a thickness 50 µm smaller than that of the medium plate member 1 and that the medium plate member 1 was aligned in such a manner that the distance (interval) between each of the surfaces of the medium plate member 1 mounted on the spindle 6 and a corresponding one of the surfaces of the guide member 2 (W1 and W2 in FIG. 11C) was 25 µm. FIG. 11C is a schematic cross-sectional view showing the positional relationship between the medium plate member 1 and the guide member 2 when the medium plate member 1 is mounted on the spindle 6 of this tape-burnishing apparatus. Thirteen magnetic recording media were produced as in Experimental Example 1, except that this apparatus was used. These magnetic recording media are referred to as "magnetic recording media C".

For both surfaces of each of magnetic recording media A, B, and C, the number of surfaces having flaws in a portion 31.5 to 32.5 mm away from the center was counted, and the flaw generation rates ((number of surfaces having flaw/26)×100(%)) were calculated. The reason flaws located in the portion 31.5 to 32.5 mm away from the center of each of the magnetic recording media are evaluated is that flaws are generated in the outermost periphery of the medium plate member 1 during the sliding from the guide member 2 toward the center of the medium plate member 1.

In magnetic recording media A, the number of surfaces having flaws was one out of 26, and the flaw generation rate was 4%. In magnetic recording media B, the number of surfaces having flaws was three out of 26, and the flaw generation rate was 12%. In magnetic recording media C, the number of surfaces having flaws was two out of 26, and the flaw generation rate was 8%. The flaw generation rate in magnetic recording media A each having the guide member 2 with the same thickness as the total thickness of the medium plate member 1 was the lowest and equal to or less than half the flaw generation rate of each of magnetic recording media B and C.

COMPARATIVE EXAMPLE 1

A medium plate member having a layer structure, a shape, and a size identical to those of the medium plate member used in Experimental Example 1 was prepared.

As shown in FIG. 12A, the medium plate member 1 was mounted on the spindle 6 in the tape-burnishing apparatus used in Experimental Example 1.

As shown in FIG. 12B, the burnishing tape 3 (manufactured by Mipox International Corp.) in the tape-burnishing apparatus was brought into contact with the medium plate member 1. The contact speed of the burnishing tape 3 to the surface of the medium plate member 1 was set at 0.5 mm/s.

As shown in FIG. 12C, burnishing of the surfaces 43 and 44 of the medium plate member 1 was performed by sliding the burnishing tape 3 in contact with the medium plate member 1 toward the outer periphery of the medium plate member 1 while the medium plate member 1 was rotated at a constant number of revolutions, thereby affording a magnetic recording medium. The burnishing tape 3 applied a constant load to the medium plate member. The sliding speed (traverse speed) was set at 3 mm/s. The position where the application of a load was initiated was set at a position 12.0 mm away from the center of the medium plate member. The position where the application of the load was terminated was set at a position 32.5 mm away from the center of the medium plate member. During the sliding, the burnishing tape 3 was not wound around the roll 32.

According to the method described above, ten magnetic recording media were made. The positions of flaws and the number of flaws in the surfaces of the resulting magnetic recording media were observed with a microscope, provided that the flaws each having a width of 10 µm or more were counted. FIG. 13 shows the observational results of the positions of flaws and the number of flaws in both surfaces of the magnetic recording media. As in the graph of FIG. 9, the horizontal axis of the graph of FIG. 13 represents the distance R (mm) from the center of the medium plate member. The vertical axis represents the total number N of flaws in both surfaces of ten magnetic recording media. In FIG. 13, "LP" represents the position (load position) where the application of the load to the medium plate member 1 is initiated, and "SD" represents the slide direction. Flaws were observed in only LP where the burnishing tape started applying the load to the magnetic recording media.

What is claimed is:

1. A method for manufacturing a storage medium comprising:
   providing a medium plate member for forming the storage medium and a guide member;
   aligning the medium plate member and the guide member so that the medium plate member and the guide member are placed adjacently and the surfaces of the medium plate member and the guide member form a substantially common plane;
   guiding a burnishing member for burnishing the medium plate member onto the surface of the guide member; and
   sliding the burnishing member on the guide member onto the medium plate member so as to burnish the surface of the medium plate member,
   wherein the guide member has substantially the same thickness as the medium plate member.

2. The method according to claim 1, wherein the medium plate member has a recording layer so that information is recorded on the recording layer and is reproduced from the recording layer.

3. The method according to claim 1, wherein the medium plate member has a substrate and recording layers on both sides of the substrate so that information is recorded on the recording layers and is reproduced from the recording layers.

4. The method according to claim 1, wherein the medium plate member and the guide member are aligned so that a distance between the medium plate member and the guide member is smaller than a width of the burnishing member, parallel to a direction of sliding the burnishing member on the medium plate member.

5. A method for manufacturing a storage medium comprising:
   providing a medium plate member for forming the storage medium and a guide member;
   aligning the medium plate member and the guide member so that the medium plate member and the guide member are placed adjacently and the surfaces of the medium plate member and the guide member form a substantially common plane;
   guiding a burnishing member for burnishing the medium plate member onto the surface of the guide member;
   sliding the burnishing member on the guide member onto the medium plate member so as to burnish the surface of the medium plate member;
   guiding another burnishing member for burnishing the medium plate member onto another surface of the guide member; and
   sliding the other burnishing member on the guide member onto the medium plate member so as to burnish another surface of the medium plate member.

6. The method according to claim 5, wherein the burnishing member and the other burnishing member are slid at the same time.

* * * * *